US011386882B2

(12) United States Patent
Carreras et al.

(10) Patent No.: US 11,386,882 B2
(45) Date of Patent: Jul. 12, 2022

(54) COMPUTATIONAL ARCHITECTURE FOR ACTIVE NOISE REDUCTION DEVICE

(71) Applicant: Bose Corporation, Framingham, MA (US)

(72) Inventors: Ricardo Federico Carreras, Southborough, MA (US); Michael P. O'Connell, Northborough, MA (US); Christopher J. Mulhearn, Worcester, MA (US); Joseph H. Cattell, Somerville, MA (US)

(73) Assignee: BOSE CORPORATION, Framingham, MA (US)

( * ) Notice: Subject to any disclaimer, the term of this patent is extended or adjusted under 35 U.S.C. 154(b) by 0 days.

(21) Appl. No.: 16/788,365

(22) Filed: Feb. 12, 2020

(65) Prior Publication Data
US 2021/0248991 A1  Aug. 12, 2021

(51) Int. Cl.
*G10K 11/178* (2006.01)
*G06N 20/00* (2019.01)

(52) U.S. Cl.
CPC ....... *G10K 11/17881* (2018.01); *G06N 20/00* (2019.01); *G10K 11/17854* (2018.01);
(Continued)

(58) Field of Classification Search
CPC .................. H04R 5/04; H04R 2460/01; G10K 11/17881; G10K 11/17885; G10K 11/17823
(Continued)

(56) References Cited

U.S. PATENT DOCUMENTS 6,717,537 B1  4/2004  Fang et al.
7,149,320 B2 * 12/2006  Haykin ............... H04R 25/407
                                                              381/320
(Continued)

FOREIGN PATENT DOCUMENTS

EP        2216774 A1      8/2010

OTHER PUBLICATIONS

Gan, Woon-Seng; "Signal Processing and AI for Spatial Augmented Reality Audio (SARA): Sensing, Control, and Rendering"; Nanyang Technological University, Singapore; Audio Engineering Society; Aug. 28, 2019; 82 Pages.
(Continued)

*Primary Examiner* — Alexander Krzystan
(74) *Attorney, Agent, or Firm* — Hoffman Warnick LLC

(57) ABSTRACT

Various implementations include a computational architecture for a personal active noise reduction (ANR) device. The device includes a communication interface that receives an audio stream, a driver, a microphone system and an ANR processing platform. The platform includes a first DSP configured to: receive the audio stream and signals from the microphone system, perform ANR on the audio stream according to a set of parameters in the first DSP, and output a processed audio stream. The platform includes a second DSP configured to: generate state data in response to an analysis of the source audio stream, signals from the microphone system, and the processed audio stream; and alter the operational parameters on the first DSP. The platform includes a general purpose processor configured to: communicate control signals with the communication interface, process state data from the second DSP, and alter the parameters on the first DSP.

18 Claims, 3 Drawing Sheets

(52) U.S. Cl.
CPC ............... *G10K 2210/1081* (2013.01); *G10K 2210/3026* (2013.01); *G10K 2210/3027* (2013.01); *G10K 2210/3028* (2013.01); *G10K 2210/3056* (2013.01)

(58) Field of Classification Search
USPC ........... 381/321, 71.6, 71.8, 71.11, 71.12, 74
See application file for complete search history.

(56) References Cited

U.S. PATENT DOCUMENTS

| | | | |
|---|---|---|---|
| 8,073,150 B2 | 12/2011 | Joho et al. | |
| 8,073,151 B2 | 12/2011 | Joho et al. | |
| 8,144,890 B2 | 3/2012 | Carreras et al. | |
| 8,165,313 B2 | 4/2012 | Carreras | |
| 8,184,822 B2 | 5/2012 | Carreras et al. | |
| 9,589,557 B2 | 3/2017 | Carreras et al. | |
| 2007/0255435 A1* | 11/2007 | Cohen ................ | H04R 25/505 700/94 |
| 2013/0156214 A1 | 6/2013 | Murthy et al. | |
| 2014/0363010 A1* | 12/2014 | Christopher ..... | G10K 11/17885 381/71.6 |
| 2015/0055785 A1* | 2/2015 | Donaldson ........... | H04R 1/1091 381/58 |
| 2015/0264469 A1 | 9/2015 | Murata et al. | |
| 2016/0110657 A1* | 4/2016 | Gibiansky .............. | G06N 20/00 706/12 |
| 2016/0241947 A1* | 8/2016 | Degraye .......... | G10K 11/17885 |
| 2016/0286313 A1* | 9/2016 | Kofman .................. | H04S 7/301 |
| 2018/0255394 A1* | 9/2018 | Colich ................. | H04R 1/2807 |
| 2018/0261199 A1 | 9/2018 | Kumar | |

OTHER PUBLICATIONS

PCT International Search Report for International Application No. PCT/US2021/017387, dated Jun. 18, 2021, 13 pages.

* cited by examiner

COMPUTATIONAL ARCHITECTURE FOR ACTIVE NOISE REDUCTION DEVICE

TECHNICAL FIELD

This disclosure generally relates to personal active noise reduction (ANR) devices. More particularly, the disclosure relates to a computational architecture for efficiently handling disparate ANR processing functions.

BACKGROUND

Headphones and other physical configurations of personal ANR device worn about the ears of a user for purposes of isolating the user's ears from unwanted environmental sounds have become commonplace. ANR headphones counter unwanted environmental noise with the active generation of anti-noise signals. These ANR headphones contrast with passive noise reduction (PNR) headsets, in which a user's ears are simply physically isolated from environmental noises. Especially of interest to users are ANR headphones that also incorporate audio listening functionality, thereby enabling a user to listen to electronically provided audio (e.g., playback of recorded audio or audio received from another device) without the intrusion of unwanted environmental noise.

As ANR devices become more popular, the demand to increase performance and add more robust features drives the need for more complex computational requirements. For example, in addition to providing state of the art signal processing, ANR devices are tasked with providing enhanced features such as providing multiple I/O ports (e.g., Bluetooth, USB, etc.), high quality telephony services, noise level control management, event handling, user experience command processing, etc. With increased computational requirements, both cost and power consumption are increased as more complex hardware is added to ANR devices.

SUMMARY

All examples and features mentioned below can be combined in any technically possible way.

Systems and methods are disclosed that describe a computational architecture for efficiently handling disparate ANR processing functions in an ANR device.

In some implementations, the described computational architecture includes at least three distinct processors, each configured to perform a set of computational functions suited to the individual processor. In these cases, the architecture allows different types of required functions to be handled by a processor that aligns with the requirements (e.g., priority, speed, memory resources) of the task. By dividing functions amongst the different processors, computational efficiencies are gained and power consumption is reduced.

One aspect provides a personal active noise reduction (ANR) device, including: a communication interface configured to receive a source audio stream and control signals; a driver; a microphone system; and an ANR computational architecture.

In certain implementations, the ANR computational architecture includes: a first DSP processor configured to: receive the source audio stream and signals from the microphone system, perform ANR on the source audio stream according to a set of operational parameters deployed in the first DSP processor, and output a processed audio stream to the driver; a second DSP processor configured to: generate state data in response to an analysis of at least one of the source audio stream, signals from the microphone system, and the processed audio stream; and alter the set of operational parameters on the first DSP; and a general purpose processor operationally coupled to the first DSP processor and the second DSP processor and configured to: communicate control signals with the communication interface, process state data from the second DSP processor, and alter the set of operational parameters on the first DSP processor.

Implementations may include one of the following features, or any combination thereof.

In certain aspects, the operational parameters are selected from a group consisting of: filter coefficients, compressor settings, signal mixers, gain terms, and signal routing options.

In other aspects, the state data generated by the second DSP processor includes error conditions detected in the processed audio stream.

In further aspects, the state data generated by the second DSP processor includes frequency domain overload conditions detected in the processed audio stream.

In some implementations, the state data generated by the second DSP includes sound pressure level (SPL) information detected from the microphone system and processed audio stream.

In further implementations, the communication interface includes a Bluetooth system.

In particular cases, the general purpose processor includes a sleep mode to conserve power, and wherein the sleep mode is configured to be woken by at least one of the first DSP processor, second DSP processor and the communication interface.

In certain aspects, the general purpose processor is further configured to apply machine learning to the state data received from the second DSP processor.

In particular implementations, the general purpose processor is further configured to apply machine learning to time-based signals. In some cases, the time-based signals include blocks of raw audio data received from a microphone system and/or via a Bluetooth system.

In other aspects, the operational parameters include filter coefficients and the general purpose processor is further configured to calculate and install updated filter coefficients on the first DSP processor.

In some cases, the general purpose processor is further configured to: evaluate the state data to identify a damage condition with the personal ANR.

Two or more features described in this disclosure, including those described in this summary section, may be combined to form implementations not specifically described herein.

The details of one or more implementations are set forth in the accompanying drawings and the description below. Other features, objects and benefits will be apparent from the description and drawings, and from the claims

Figure 1:
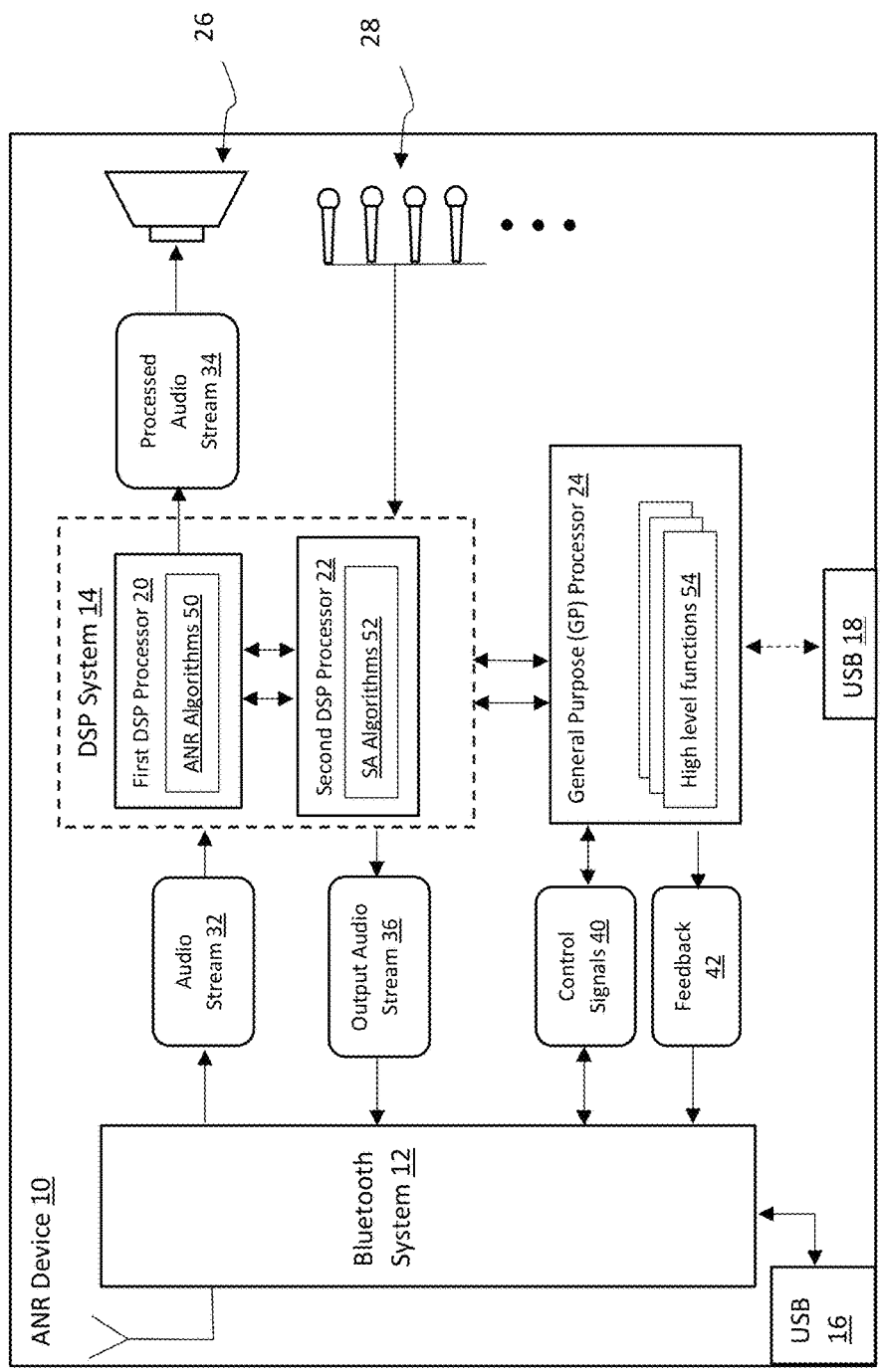
FIG. 1 depicts a block diagram of an ANR device having a hierarchical computational architecture according to various implementations.
Figure 1:
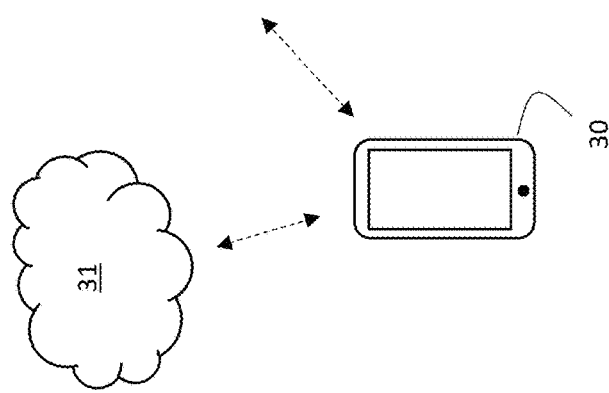

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

Various implementations of the disclosure describes a computational architecture for an active noise reduction (ANR) device that includes at least three distinct processors, each configured to perform a set of computational functions suited to the individual processor. The architecture thus allows each required function to be handled by a processor that aligns with the requirements (e.g., priority, speed, memory resources) of the task. By dividing functions amongst the different processors, computational efficiencies can be gained and power consumption may be reduced.

While this disclosure provides an architecture for devices such as headphones that employ ANR, an exhaustive description of ANR is omitted for brevity purposes. To the extent necessary, illustrative ANR systems are for example described in U.S. Pat. No. 8,280,066, entitled "Binaural Feedforward-based ANR" issued to Joho et al., on Oct. 2, 2012, and U.S. Pat. No. 8,184,822 "ANR Signal Processing Topology" issued to Carreras et al., on May 22, 2012, the contents of both of which are hereby incorporated by reference.

The solutions disclosed herein are intended to be applicable to a wide variety of personal ANR devices, i.e., devices that are structured to be at least partly worn by a user in the vicinity of at least one of the user's ears to provide ANR functionality for at least that one ear. It should be noted that although various specific implementations of personal ANR devices may include headphones, two-way communications headsets, earphones, earbuds, audio eyeglasses, wireless headsets (also known as "earsets') and ear protectors, presentation of specific implementations are intended to facilitate understanding through the use of examples, and should not be taken as limiting either the scope of disclosure or the scope of claim coverage.

Additionally, the solutions disclosed herein are applicable to personal ANR devices that provide two-way audio communications, one-way audio communications (i.e., acoustic output of audio electronically provided by another device), or no communications, at all. Further, what is disclosed herein is applicable to personal ANR devices that are wirelessly connected to other devices, that are connected to other devices through electrically and/or optically conductive cabling, or that are not connected to any other device, at all. These teachings are applicable to personal ANR devices having physical configurations structured to be worn in the vicinity of either one or both ears of a user, including and not limited to, headphones with either one or two earpieces, over-the-head headphones, behind-the neck headphones, headsets with communications microphones (e.g., boom microphones), wireless headsets (i.e., earsets), audio eyeglasses, single earphones or pairs of earphones, as well as hats, helmets, clothing or any other physical configuration incorporating one or two earpieces to enable audio communications and/or ear protection.

Beyond personal ANR devices, what is disclosed and claimed herein is also meant to be applicable to the provision of ANR in relatively small spaces in which a person may sit or stand, including and not limited to, phone booths, car passenger cabins, etc.

FIG. 1 depicts a block diagram of a personal ANR device 10, which in one example may be structured to be worn by a user to provide active noise reduction (ANR) in the vicinity of at least one of the user's ears. The personal ANR device 10 may have any of a number of physical configurations, including configurations that incorporate a single earpiece to provide ANR to only one of the user's ears, others that incorporate a pair of earpieces to provide ANR to both of the user's ears, and others that incorporate one or more standalone speakers to provide ANR to the environment around the user. However, it should be noted that for the sake of simplicity of discussion, only a single device 10 is depicted and described in relation to FIG. 1. As will also be explained in greater detail, the personal ANR device 10 incorporates functionality that may provide either or both feedback-based ANR and feedforward-based ANR, in addition to possibly further providing pass-through audio.

In the illustrative embodiment of FIG. 1, ANR device 10 includes a wireless communication interface, in this case Bluetooth system 12, that provides communications with an audio gateway device (or simply, gateway device) 30, such as a smartphone, wearable smart device, laptop, tablet, server, etc. Bluetooth system 12 may for example be implemented as a Bluetooth System-On-Chip (SoC), Bluetooth Low Energy (BLE) module, or in any other manner. It is noted that while ANR device 10 is shown using a Bluetooth system 12 to provide wireless communications, any type of wireless technology could be used in its place (e.g., Wi-Fi Direct, Cellular, etc.). Communication with the ANR device 10 may also occur via a first universal serial bus (USB) port 16 that interfaces with Bluetooth system 12 and/or a second USB port 18 that interfaces with a general purpose (GP) processor 24. GP processor 24 is one of at least three processors implemented on ANR device 10, the others being a first digital signal processing (DSP) processor 20 and a second DSP processor 22, the two of which form a DSP system 14.

In a typical application, a source audio stream 32 is received via the Bluetooth system 12 from gateway device 30 and passed to the DSP system 14, where the first DSP processor 20 performs ANR and generates a processed audio stream 34, which is then broadcast via an acoustic driver 26 (i.e., speaker). A microphone system 28 captures environmental noise sounds that are provided to the DSP system 14 to, e.g., provide a reference signal for generating anti-noise sounds for ANR. For instance, using the captured sounds, anti-noise signals are calculated and output by the acoustic driver 26 with amplitudes and time shifts calculated to acoustically interact with unwanted noise sounds in the surrounding environment. Microphone system 28 may also be used to capture the user's voice for telephony applications and the like which can be communicated via an output audio stream 36 to the Bluetooth system 12, and then to gateway device 30. It is understood that the number and position of individual microphones in the microphone system 28 will depend on the particular requirements of the ANR device 10. In addition, as noted, rather than using Bluetooth system 12 to communicate with gateway device 30, any type of communication interface may be implemented, e.g., USB ports 16, 18 or other communication ports and protocols (not shown).

In addition to audio streams, control signals 40 can also be communicated between the gateway device 30 and the GP processor 24. Control signals 40 may for example include: data packets from the gateway device 30 (e.g., to update controllable noise cancellation (CNC) levels); ANR device generated data packets that are communicated to the gateway device 30 (e.g., to provide coordination between a pair of ear buds); user generated control signals (e.g., skip to the next song, answer the phone, set CNC levels, etc.), etc. Moreover, as explained in further detail herein, GP processor 24 can generate feedback 42 (e.g., product usage characteristics, fault detections, etc.) that can be reported back to the gateway device 30 and/or to a remote service such as cloud platform 31. Feedback 42 can for example be used to enhance the user experience by providing details regarding how the ANR device 10 is used, reporting on error conditions, etc.

ANR device 10 generally includes additional components, which are omitted for brevity, including, e.g., a power source, visual input/outputs such as a GUI and/or LED indicators, tactile inputs/outputs, power and control switches, additional memory, capacitive inputs, sensors, etc.

As noted, the computational architecture of ANR device 10 utilizes at least three distinct processors that provide a modular and hierarchical operational platform for implementing functions associated with the ANR device 10. Using this architecture, the processing capabilities of each processor are aligned with specific tasks to enhance the efficiency of the system. In general, the first DSP processor 20 provides a set of core ANR algorithms 50 designed to provide active noise reduction to the audio stream 32; the second DSP processor 22 provides a set of signal analytics (SA) algorithms 52 designed to analyze the ANR operations and provide state data such as operational characteristics, faults, etc., as well as automatically adjust parameters within ANR algorithms 50 in response to any available signals within ANR device 10; and the GP processor 24 provides a set of high level functions 54 such as managing user controls, providing I/O processing, handling events generated by the DSP system 14, implementing power mode levels, etc.

Figure 2:
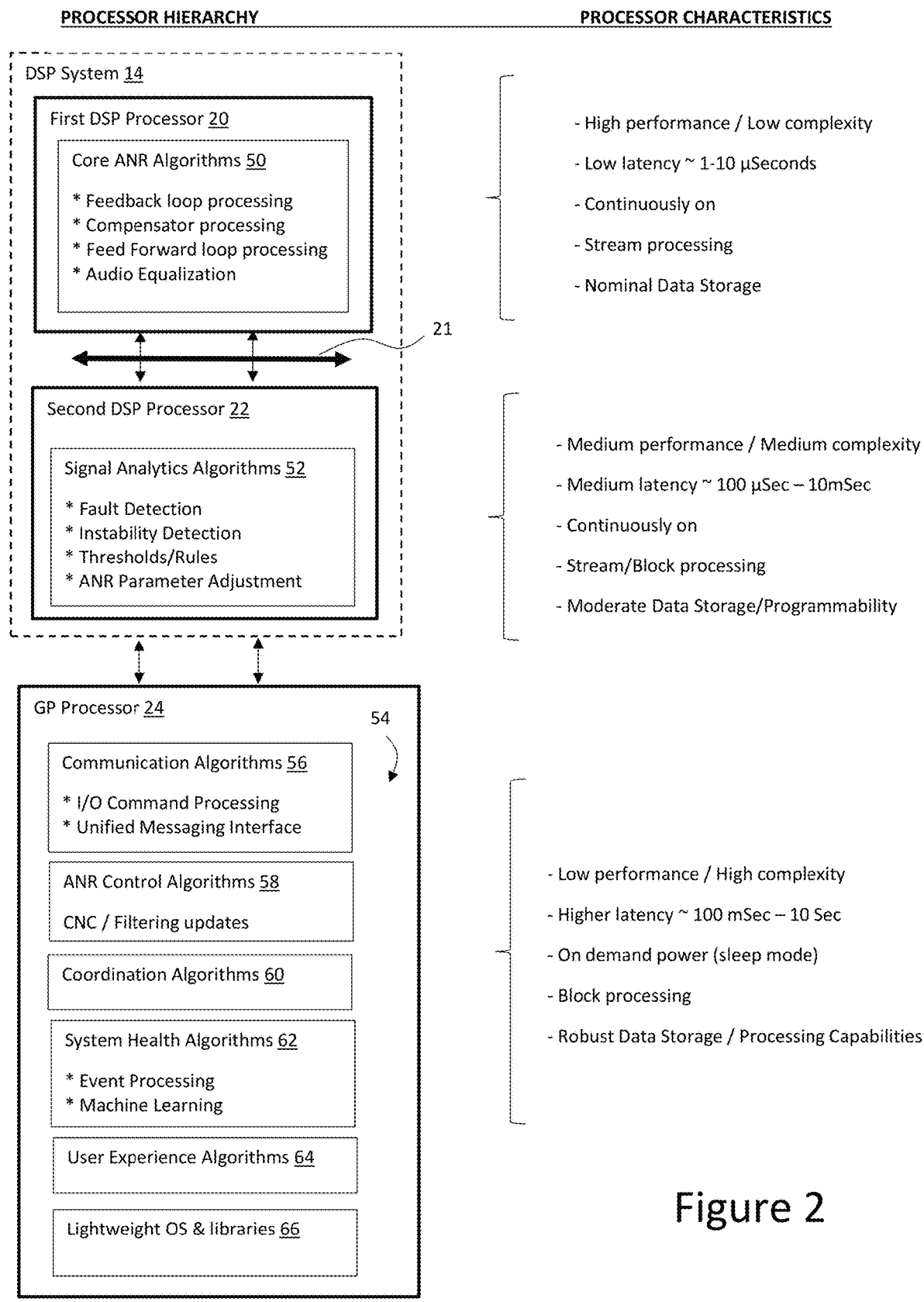
FIG. 2 depicts a detailed view of a computational architecture according to various implementations.

FIG. 2 depicts the processer hierarchy and characteristics in greater detail. In this illustrative embodiment, both the first DSP processor 20 and second DSP processor 22 share a common bus 21 such that they both have access to the GP processor 24, microphone system 28, audio streams, etc. As noted herein, the first DSP processor 20 includes a set of core ANR algorithms 50 that process an inputted audio stream 32 (FIG. 1), including for example, feedback loop processing, compensator processing, feed forward loop processing, and audio equalization. The core ANR algorithms 50 may include operational ANR parameters that, for example, dictate filter coefficients, compressor settings, signal mixers, gain terms, signal routing options, etc. Core ANR algorithms 50 can generally be characterized as processes that are stream processing oriented and require a high level of processor performance but relatively low complexity. In particular, the functions performed by the core ANR algorithms 50 are intended to operate extremely quickly with a minimal amount of processing options and storage requirements. For these types of stream processing functions, very low latency is required, e.g., on the order of 1-10 microseconds. Additionally, because the first DSP processor 20 provides the core ANR functionality, the first DSP processor 20 must be continuously powered on so long as the ANR device 10 is operational. The first DSP processor 20, consequently, is tailored to implement calculations for ANR algorithms 50 using as little power as possible.

The second DSP processor 22 includes a set of signal analytics algorithms 52 that do not directly provide ANR processing, but instead analyze signals and generate state data that, e.g., characterize signals within the ANR device 10 and ANR processing being performed by the first DSP processor 20. The state data may include, for example, fault information, instability detection, performance characteristics, error conditions, frequency domain overload conditions, sound pressure level (SPL) information etc. The signal analytics algorithms 52 perform different types of analysis that may employ threshold values and rules. For instance, if a series of frequency characteristics deviate from an expected range, a fault can be triggered causing a corresponding "event" to be outputted to the GP processor 24, which can then take corrective action.

Any process adapted to analyze signals can be deployed in the second DSP processor 22. Non-limiting illustrative signal analytics algorithms 52 are described, for example, in: U.S. Pat. No. 10,244,306 issued on Mar. 26, 2019, entitled, "Real-time detection of feedback instability" (e.g., describing instability detection); US Pub. Nos.: 2018/0286374, entitled, "Parallel Compensation in Active Noise Reduction Devices"; 2018/0286373, entitled, "Dynamic Compensation in Active Noise Reduction Devices"; 2018/0286375, entitled Automatic Gain Control in Active Noise Reduction (ANR) Signal Flow Path" (e.g., describing overload conditions); and US Pub. No. 2019/0130928, entitled, "Compressive Hear-through in Personal Acoustic Devices" (e.g., describing control of ANR to produce maximum loudness at the ear), each of which is hereby incorporated by reference in its entirety.

As noted herein, the second DSP processor 22 can also directly alter the operational (i.e., ANR) parameters of the first DSP processor 20. For example, in particular cases, the signal analytics algorithms 52 are deployed to automatically adjust ANR parameters (i.e., within core ANR algorithms 50) to achieve a desired experience based upon internal signals captured from algorithms 50, 52, from GP processor 24, from any of the microphones 28, from the input audio stream 32, and/or from control signals 40. For example, in certain implementations, ANR parameters are adjusted using external signals monitored by algorithms 52 such as external sound pressure level (SPL) characteristics received by the microphone(s) 28.

Because the second DSP processor 22 does not directly implement core ANR services, a relatively lesser amount of performance is required, however a relatively greater amount of computational complexity is provided. For example, in particular cases, tasks performed by the second DSP processor 22 may tolerate a greater amount of latency on the order of, e.g., 100 microseconds to 10 milliseconds. Similar to the first DSP processor 20, the second DSP processor is also continuously powered when device 10 is operational. In certain implementations, the second DSP processor 22 is configured to perform both stream and block processing, and includes a moderate amount of data storage and programmability to perform analysis tasks in an effective manner.

GP processor 24 includes a set of high level functions 54 that are one level further removed from the ANR processing performed by the first DSP processor 20. The specific functions 54 implemented by the GP processor 24 can depend on the requirements of the ANR device 10. A set of illustrative functions are shown in FIG. 2. In certain illustrative implementations, communication algorithms 56 handle I/O and command processing functions. In some cases, the communications algorithms 56 include a unified messaging interface for converting different communication protocols (e.g., USB versus Bluetooth) into a common protocol. The unified messaging interface allows code for interpreting commands to be stored and implemented in a single location (i.e., the GP processor 24), and thus allows all commands to be routed to the GP processor 24 for handling.

GP processor 24 is generally tasked with handling larger and more complicated calculations. In some implementations, GP processor 24 calculates "one-time" filter coefficients that are customized to an individual user based on how the product fits on his or her head. In particular implementations, user experience algorithms 64 analyze user fit based, e.g., on control signals 40 and feedback 42, and communication algorithms 56 inform the user to adjust the fit of the device 10 in response to a fitting algorithm.

In various implementations, the GP processor 24 further includes ANR control algorithms 58 that update operational parameters for the first DSP processor 20 in response to events received from the DSP system 14, or in response to control signals 40 received from the gateway device 30 (FIG. 1). In certain cases, control algorithms 58 implement CNC (controllable noise cancellation) features, etc.

As noted, GP processor 24 may receive "events" from the second DSP processor 22, e.g., indicating instability or some other issue, e.g., detected using the techniques described in U.S. Pat. No. 10,244,306 (previously incorporated by reference herein). If immediate changes are required to mitigate instability based on one or more received events, the second DSP processor 22 would typically be responsible for altering ANR parameters in the first DSP processor 20. Regardless as to whether immediate alterations are required, the GP processor 24 can record events are they are generated in local memory and report the event(s) out via the Bluetooth system 12 (FIG. 1).

After collecting a series of events, GP processor 24 can utilize one or more of its algorithms to identify and/or address conditions. For example, if multiple instability events are detected, then system health algorithms 62 are deployed to determine if a more severe issue exists (e.g., a malfunction in the ANR device 10). In the case that a malfunction is identified, the system health algorithm 62 is configured to characterize the malfunction, and based on the nature of the malfunction, system heath algorithm 62 directly initiates ANR parameter changes on the DSP processor 20. In other cases, system health algorithms 62 take other actions such as analyze event data, report the analysis to the gateway device 30, apply machine learning to determine the cause of the malfunction, etc. As noted, damage conditions of the ANR device 10 are reported back to the gateway device 30 to inform the device user (or another user) that the ANR device 10 is malfunctioning.

As an example, when an instability event is detected, e.g., using the technique described in U.S. Pat. No. 10,244,306 (previously incorporated by reference herein), the GP processor 24 logs the event. In the case that a detected number of instability events exceeds a predetermined threshold, the GP processor 24 is configured to provide a notification (e.g., to the device user or another user) that the device 10 appears to be malfunctioning. Similarly, if data measured when calculating filter coefficients customized to an individual user based on how the product fits on his or her head indicates something unusual (e.g., a poor fit, as characterized by unexpected differences in feedback versus feedforward microphone signals), the GP processor 24 provides feedback instructing the user to adjust the device, e.g., for fit.

In other cases, coordination algorithms 60 are deployed to coordinate performance between a pair of earphones (e.g., earbuds, over-ear audio devices, etc.). For example, in response to detecting that a first earphone is operating at a low ANR performance level (e.g., due to a detected fault), the coordination algorithm 60 cause the second earphone to match the ANR performance level of the first earphone to avoid a performance mismatch and ensure a better user experience.

In various implementations, user experience algorithms 64 are deployed to provide user controls such as volume, equalization, etc., and implement different operating modes such as telephony, music listening, etc. User experience algorithms 64 can be implemented to analyze sensor data to automatically control the ANR device 10 (e.g., provide special settings when on an airplane), collect and provide feedback that can be analyzed remotely, etc. In other cases, the algorithms 64 respond to state data that the ANR device 10 is poorly fit (e.g., a proper seal with the user's ear canal is not detected) and output a warning (e.g., to the device user or another user).

In additional implementations, GP processor 24 is configured to implement machine learning models or event classifiers. In some examples, the GP processor 24 is configured to apply machine learning to state data received from the second DSP processor 22. In more particular examples, the GP processor 24 is configured to apply machine learning to state data received from the second DSP processor 22 and to time-based signals such as blocks of raw audio data. In some cases, the time-based signals (which can include raw, or unprocessed audio data) are received via microphone system 28 and/or Bluetooth system 12 (e.g., as an audio stream 32). Illustrative machine learning techniques involving signal processing are described in U.S. application Ser. No. 16/425,550, filed May 29, 2019, titled "Automatic Active Noise Reduction (ANR) Control" and U.S. application Ser. No. 16/690,675, filed Nov. 21, 2019, titled "Active Transit Vehicle Classification," which are hereby incorporated by reference in their entirety.

In further implementations, to instantiate the various functions 54 on GP processor 24, a lightweight operating system (OS) and/or functional libraries 66 can be implemented that: allows algorithms and routines to be easily accessed, added and removed; allows software updates to be performed; provides access to storage; provides use of higher level scripts and/or programming languages, etc.

Because the GP processor 24 does not perform any time-critical signal processing services, the GP processor 24 can be implemented with relatively low performance, but requires a relatively high amount of computational complexity in order to provide a wide assortment of functionality. Latency can be relatively high, e.g., on the order of 100 milliseconds to 10 seconds, when performing functions. Furthermore, because its functionality is not always required, GP processor 24 is configured to be placed into a lower power mode or sleep mode when not needed (e.g., when no events are detected or require analysis). The sleep mode is configured to be woken by at least one of the first DSP processor 20, second DSP processor 22 and/or control signals received from one of the communications interfaces. Generally, GP processor 24 need not handle any stream processing, but rather processes data as blocks using standard memory configurations. Data storage can be implemented, e.g., using internal storage and/or flash drives as needed.

Figure 3:
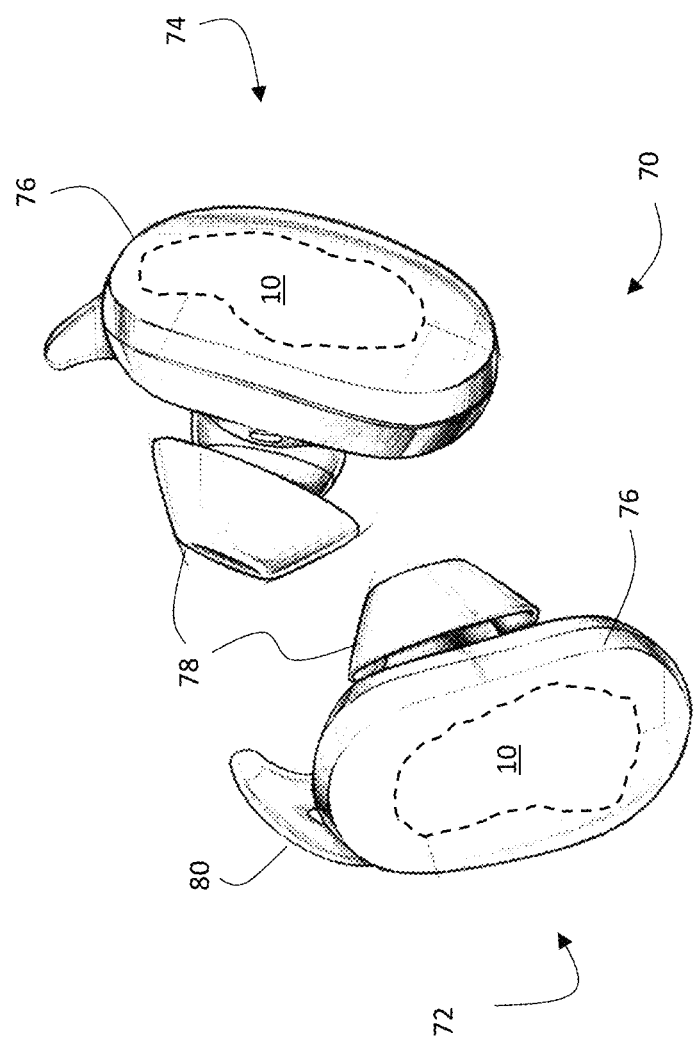
FIG. 3 depicts an illustrative personal ANR wearable according to various implementations.

FIG. 3 is a schematic depiction of an illustrative wearable audio device 70 that includes the ANR device 10 of FIG. 1. In this example, the wearable audio device 70 is an audio headset that includes two earphones (for example, in-ear headphones, also called "earbuds") 72, 74. While the earphones 72, 74 are shown in a "true" wireless configuration (i.e., without tethering between earphones 72, 74), in additional implementations, the audio headset 70 includes a tethered wireless configuration (whereby the earphones 72, 74 are connected via wire with a wireless connection to a playback device) or a wired configuration (whereby at least one of the earphones 72, 74 has a wired connection to a playback device). Each earphone 72, 74 is shown including a body 76, which can include a casing formed of one or more plastics or composite materials. The body 76 can include a nozzle 78 for insertion into a user's ear canal entrance and a support member 80 for retaining the nozzle 78 in a resting position within the user's ear. Each earphone 72, 74 includes an ANR device 10 for implementing some or all of the various functions described herein. Other wearable device forms could likewise be implemented with the ANR device 10, including around-the-ear headphones, audio eyeglasses, open-ear audio devices etc.

It is understood that one or more of the functions in ANR device 10 may be implemented as hardware and/or software, and the various components may include communications pathways that connect components by any conventional means (e.g., hard-wired and/or wireless connection). For example, one or more non-volatile devices (e.g., centralized or distributed devices such as flash memory device(s)) can store and/or execute programs, algorithms and/or parameters for one or more systems in the ANR device 10 (e.g., Bluetooth system 12, DSP system 14, GP 24, etc.). Additionally, the functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions. All or part of the functions can be implemented as, special purpose logic circuitry, e.g., an FPGA (field programmable gate array) and/or an ASIC (application-specific integrated circuit). Processors suitable for the execution of a computer program include, by way of example, both general and special purpose microprocessors, and any one or more processors of any kind of digital computer. Generally, a processor may receive instructions and data from a read-only memory or a random access memory or both. Components of a computer include a processor for executing instructions and one or more memory devices for storing instructions and data.

Additionally, actions associated with implementing all or part of the functions described herein can be performed by one or more networked computing devices. Networked computing devices can be connected over a network, e.g., one or more wired and/or wireless networks such as a local area network (LAN), wide area network (WAN), personal area network (PAN), Internet-connected devices and/or networks and/or a cloud-based computing (e.g., cloud-based servers).

In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

A number of implementations have been described. Nevertheless, it will be understood that additional modifications may be made without departing from the scope of the inventive concepts described herein, and, accordingly, other implementations are within the scope of the following claims.

We claim:

1. A personal active noise reduction (ANR) device, comprising:
   a communication interface configured to receive a source audio stream and control signals;
   a driver;
   a microphone system; and
   an ANR computational architecture, comprising:
      a first DSP processor configured to: receive the source audio stream and signals from the microphone system, perform ANR on the source audio stream according to a core algorithm that utilizes a set of operational parameters stored in the first DSP processor, and output a processed audio stream to the driver;
      a second DSP processor configured to: generate state data in response to an analysis of at least one of the source audio stream, signals from the microphone system, and the processed audio stream; and communicate signals to the first DSP processor over a common bus to alter the set of operational parameters stored in the first DSP processor; and
      a general purpose processor operationally coupled to the first DSP processor and the second DSP processor and configured to: communicate control signals with the communication interface, process state data from the second DSP processor, and alter the set of operational parameters stored in the first DSP processor;
      wherein the first DSP processor and the second DSP processor share signals over the common bus that is also accessible by the general purpose processor, and wherein the first DSP processor and second DSP processor operate at different speeds in which the first DSP processor functions with a lower latency relative to the second DSP processor.

2. The personal ANR device of claim 1, wherein the operational parameters are selected from a group consisting of: filter coefficients, compressor settings, signal mixers, gain terms, and signal routing options.

3. The personal ANR device of claim 1, wherein the state data generated by the second DSP processor includes error conditions detected in the processed audio stream.

4. The personal ANR device of claim 1, wherein the state data generated by the second DSP processor includes:
   frequency domain overload conditions detected in the processed audio stream; and
   sound pressure level (SPL) information detected from the microphone system and processed audio stream.

5. The personal ANR device of claim 1, wherein the general purpose processor comprises a sleep mode to conserve power, and wherein the sleep mode is configured to be woken by at least one of the first DSP processor, second DSP processor and the communication interface.

6. The personal ANR device of claim 1, wherein the general purpose processor is further configured to apply machine learning to at least one of time-based signals or the state data received from the second DSP processor.

7. The personal ANR device of claim 1, wherein the operational parameters include filter coefficients and the general purpose processor is further configured to calculate and install updated filter coefficients on the first DSP processor.

8. The personal ANR device of claim 1, wherein the general purpose processor is further configured to: evaluate the state data to identify a damage condition with the personal ANR.

9. An active noise reduction (ANR) computational architecture, comprising:
a first DSP processor configured to: receive a source audio stream, perform ANR on the source audio stream according to a core algorithm that utilizes a set of operational parameters stored in the first DSP processor, and output a processed audio stream;
a second DSP processor configured to: generate state data in response to an analysis of at least one of the source audio stream, microphone inputs and the processed audio stream, and communicate signals to the first DSP processor over a common bus coupled to the first and second DSP processors to alter the operational parameters stored in the first DSP; and
a general purpose processor operationally coupled to both the first DSP processor and the second DSP processor and configured to: communicate control signals with a communication interface, process state data from the second DSP processor, and alter the operational parameters stored in the first DSP processor;
wherein the first DSP processor and the second DSP processor share signals over the common bus that is also accessible by the general purpose processor, and wherein the first DSP processor and second DSP processor operate at different speeds in which the first DSP processor functions with a lower latency relative to the second DSP processor.

10. The ANR computational architecture of claim 9, wherein the operational parameters are selected from a group consisting of: filter coefficients, compressor settings, signal mixers, gain terms, and signal routing options.

11. The ANR computational architecture of claim 9, wherein the state data generated by the second DSP processor includes error conditions detected in the microphone inputs and processed audio stream.

12. The ANR computational architecture of claim 9, wherein the state data generated by the second DSP processor includes:
frequency domain overload conditions detected in the processed audio stream; and
sound pressure level (SPL) information detected from the microphone system and processed audio stream.

13. The ANR computational architecture of claim 9, wherein the general purpose processor comprises a sleep mode to conserve power, wherein the sleep mode is configured to be woken by at least one of the first DSP processor, second DSP processor and the communication interface.

14. The ANR computational architecture of claim 9, wherein the general purpose processor is further configured to apply machine learning to at least one of time-based signals or the state data received from the second DSP processor.

15. The ANR computational architecture of claim 9, wherein the general purpose processor is further configured to calculate and install updated filter coefficients in the first DSP processor.

16. The ANR computational architecture of claim 9, wherein the general purpose processor is further configured to evaluate state data to identify a damage condition and to communicate the damage condition to an external device via the communication interface.

17. The personal ANR device of claim 1, wherein the first DSP processor and second DSP processor comprise distinct and separate physical devices.

18. The ANR computational architecture of claim 9, wherein the first DSP processor and second DSP processor comprise distinct and separate physical devices.

* * * * *